(12) United States Patent
Kyung

(10) Patent No.: US 12,342,912 B2
(45) Date of Patent: Jul. 1, 2025

(54) UMBRELLA HANDLE INCLUDING PORTABILITY-IMPROVING STRUCTURE

(71) Applicant: XXOKK INTERNATIONAL CO., LTD., Hanam-si (KR)

(72) Inventor: Min Soo Kyung, Seoul (KR)

(73) Assignee: XXOKK INTERNATIONAL CO., LTD., Hanam-si (KR)

( * ) Notice: Subject to any disclaimer, the term of this patent is extended or adjusted under 35 U.S.C. 154(b) by 0 days.

(21) Appl. No.: 18/881,533

(22) PCT Filed: Jul. 31, 2023

(86) PCT No.: PCT/KR2023/011117
§ 371 (c)(1),
(2) Date: Jan. 6, 2025

(87) PCT Pub. No.: WO2024/106686
PCT Pub. Date: May 23, 2024

(65) Prior Publication Data
US 2025/0160492 A1    May 22, 2025

(30) Foreign Application Priority Data
Nov. 15, 2022  (KR) .......................... 20-2022-0002678

(51) Int. Cl.
*A45B 19/00*    (2006.01)
*A45B 9/02*     (2006.01)
(Continued)

(52) U.S. Cl.
CPC ................ *A45B 19/00* (2013.01); *A45B 9/02* (2013.01); *A45B 2019/002* (2013.01); *A45B 25/02* (2013.01); *H04M 1/72409* (2021.01)

(58) Field of Classification Search
CPC ........... A45B 19/00; A45B 9/02; A45B 25/02; A45B 2019/002
See application file for complete search history.

(56) References Cited

U.S. PATENT DOCUMENTS 868,326  A  * 10/1907  Casale .................. A45B 19/06
                                                           135/25.41
892,813  A  *  7/1908  Dolles .................... A45B 25/24
                                                           135/25.41
(Continued)

FOREIGN PATENT DOCUMENTS

JP         2009-218671 A   9/2009
KR   20-2007-0000209 U     2/2007
(Continued)

OTHER PUBLICATIONS

International Search Report of PCT/KR2023/011117 dated Nov. 1, 2023 [PCT/ISA/210].
(Continued)

*Primary Examiner* — Noah Chandler Hawk
(74) *Attorney, Agent, or Firm* — Sughrue Mion, PLLC

(57) ABSTRACT

Provided is an umbrella handle mounted on an umbrella including an umbrella canopy that is opened to protect against rain or folded, umbrella ribs supporting a lower surface of the umbrella canopy, and a link structure mounted to unfold or fold the umbrella ribs, the umbrella handle including a main pole; a link driving part; a downward extension pole; a holding binding part that is mounted on a lower end of the downward extension pole, has a tubular structure that is able to be inserted into or withdrawn from a holding part; and the holding part that has a tubular structure in which an insertion hole is formed at an upper portion to allow the holding binding part and the link driving part to partially be inserted into or withdrawn from an upper surface and that has a structure held by a hand of a user.

2 Claims, 16 Drawing Sheets

(51) Int. Cl.
*A45B 25/02* (2006.01)
*H04M 1/72409* (2021.01)

(56) References Cited

U.S. PATENT DOCUMENTS

| | | | | |
|---|---|---|---|---|
| 3,683,948 | A | * | 8/1972 | Cohen .................... A45B 25/16 |
| | | | | 135/25.1 |
| 3,825,024 | A | * | 7/1974 | Cohen .................... A45B 19/00 |
| | | | | 135/25.1 |
| 4,456,023 | A | * | 6/1984 | Fujihashi ............... A45B 25/24 |
| | | | | 135/25.41 |
| 5,186,197 | A | | 2/1993 | Lavine |

FOREIGN PATENT DOCUMENTS

| | | |
|---|---|---|
| KR | 20-0445241 Y1 | 7/2009 |
| KR | 10-2016-0085767 A | 7/2016 |
| KR | 10-2258346 B1 | 5/2021 |
| KR | 20-0497111 Y1 | 7/2023 |

OTHER PUBLICATIONS

Korean Request for the Submission of an Opinion of No. 20-2022-0002678 dated May 26, 2023.
Korean Written Decision on Registration of No. 20-2022-0002678 dated Jul. 19, 2023.

* cited by examiner

UMBRELLA HANDLE INCLUDING PORTABILITY-IMPROVING STRUCTURE

CROSS REFERENCE TO RELATED APPLICATIONS

This application is a National Stage of International Application No. PCT/KR2023/011117 filed on Jul. 31, 2023, claiming priority based on Korean Patent Application No. 20-2022-0002678 filed on Nov. 15, 2022, the entire disclosures of which are incorporated herein by reference.

TECHNICAL FIELD

The present invention relates to an umbrella handle, and more particularly, to an umbrella handle that can be stretched or contracted to make the length of the umbrella longer or shorter, thereby improving portability.

BACKGROUND ART

An umbrella shaft of a conventional multi-stage folding automatic umbrella is formed by coupling hollow tubes to each other in a cup joint manner, and umbrella shafts of multi-stage folding umbrellas that are currently in use are mostly made of three-stage to five-stage tubular bodies. For example, a three-stage tubular body is made of an outer tube, a middle tube, and an inner tube sequentially disposed from an outer side to an inner side according to the size of a tube diameter. Since the umbrella shaft is only made of three stages, a length of each tube is still relatively long, and reduction of the volume of the umbrella at the time of contraction is limited, which makes it inconvenient to carry the umbrella.

Therefore, multi-stage folding umbrellas having umbrella shafts made of a four-stage or five-stage tubular body have become available on the market, but in order to prevent a twisting phenomenon between tubes, each tube of such an umbrella shaft is mostly formed to have a polygonal cross-section. However, a polygonal corner of a tubular body causes numerous inconveniences in use such as increasing friction between tubes, causing a contact portion between the tubes to wear out easily, and making it difficult to unfold and fold the umbrella. There is also a problem in that the larger the number of stages of an umbrella shaft, the greater the diameter of an outer tube should be to ensure strength of the umbrella shaft.

In order to address such problems, as illustrated in FIG. 1, umbrellas having various lengths and umbrella canopy areas have been developed.

However, in the case of the umbrellas according to the related art, when the length of the umbrella is increased, there is a problem in that portability decreases, and when the length of the umbrella is decreased, portability increases, but there is a problem in that the umbrella canopy area significantly decreases.

Therefore, there is a need for technology that can address the problems according to the related art.

DISCLOSURE

Technical Problem

The present invention is directed to providing an umbrella handle including a configuration that allows a user to change a length of an umbrella to be longer or shorter according to his or her intention, thereby further improving portability while maintaining an umbrella canopy area.

Technical Solution

For achieving the above objective, one aspect of the present invention provides an umbrella handle mounted on an umbrella including an umbrella canopy that is opened to protect against rain or folded, umbrella ribs supporting a lower surface of the umbrella canopy, and a link structure mounted to unfold or fold the umbrella ribs, the umbrella handle including a main pole that has an upper end binding part, having a structure disposed at a center of the lower surface of the umbrella canopy and bound to the umbrella ribs, mounted on an upper end and that extends a predetermined length downward; a link driving part mounted on an outer circumferential surface of the main pole to be movable by sliding in a vertical height direction and bound to the link structure by a hinge structure; a downward extension pole mounted to have a structure that is able to stretch downward from a lower end of the main pole or contract; a holding binding part that is mounted on a lower end of the downward extension pole, has a tubular structure that is able to be inserted into or withdrawn from a holding part, and has an operation switch of the link driving part mounted on an outer circumferential surface; and the holding part that has a tubular structure in which an insertion hole is formed at an upper portion to allow the holding binding part and the link driving part to partially be inserted into or withdrawn from an upper surface and that has a structure held by a hand of a user.

In one embodiment of the present invention, the link driving part may include an upper sliding part having a tubular structure mounted on the outer circumferential surface of the main pole to be movable by sliding in the vertical height direction; a lower sliding part having a tubular structure that is integrally formed with the upper sliding part, is mounted on the outer circumferential surface of the main pole to be movable by sliding in the vertical height direction, and has an outer diameter that enables insertion or withdrawal into or from the insertion hole of the holding part; and a hinge binding part integrally mounted between the upper sliding part and the lower sliding part and extending a predetermined width toward both sides to be bound to the link structure by the hinge structure.

In addition, the downward extension pole may include a first extension part mounted by a sliding binding structure that is able to be inserted a predetermined depth into the main pole from the lower end of the main pole or discharged therefrom; and a second extension part mounted by a sliding binding structure that is able to be inserted a predetermined depth into the first extension part from a lower end of the first extension part or discharged therefrom.

In one embodiment of the present invention, the holding binding part may include a binding protrusion formed to have a spiral protrusion structure that is formed at a predetermined height on a lower portion of the holding binding part to continuously surround an outer circumferential surface of the holding binding part.

In this case, the holding part may include a binding groove that has a tubular structure and is formed to have a recessed groove structure on an inner circumferential surface of a hollow structure to correspond to the binding protrusion.

In one embodiment of the present invention, the holding binding part may include a second binding metal plate mounted to be spaced a predetermined height from the lower portion of the holding binding part and having a structure continuous with the outer circumferential surface of the holding binding part.

In this case, the link driving part may include a first binding metal plate mounted on an upper portion of the lower sliding part and having a structure continuous with an outer circumferential surface of the lower sliding part.

In addition, the holding part may include a magnetic member having a tubular structure, provided as a plurality of magnetic members mounted to be spaced a predetermined height from the inner circumferential surface of the hollow structure, having a structure attachable to and detachable from the first binding metal plate and the second binding metal plate by magnetism, and having a structure continuous with the inner circumferential surface of the hollow structure.

In one embodiment of the present invention, the holding binding part may include a second rail part having a structure that is formed to continuously protrude from both side surfaces of the holding binding part in the vertical height direction and formed to have a protruding part seated thereon and guide the protruding part to be movable by sliding in the vertical height direction.

In this case, the link driving part may include a first rail part having a structure that is formed to continuously protrude from both side surfaces of the lower sliding part in the vertical height direction, formed to be continuous with the second rail part, and formed to, together with the second rail part, have the protruding part seated thereon and guide the protruding part to be movable by sliding in the vertical height direction.

In addition, the holding part may include a protruding part that has a tubular structure and has a structure formed to continuously protrude from both sides of the inner circumferential surface of the hollow structure in the vertical height direction and seated on the second rail part and the first rail part to be movable by sliding in the vertical height direction.

In one embodiment of the present invention, the holding part may include a wireless communication module mounted in the holding part and configured to wirelessly communicate with a smart device of the user; a communication control switch mounted adjacent to the operation switch and configured to control an operation state of the wireless communication module; and a voice signal input/output part mounted on one side of the link driving part and configured to output a voice signal received from the wireless communication module or receive a voice signal generated by the user and input the voice signal to the smart device of the user through the wireless communication module.

In one embodiment of the present invention, the insertion hole of the holding part may include an insertion hole upper portion that has a structure having a depth equal to an extension length of the lower sliding part of the link driving part; and an insertion hole lower portion that has a structure having a central axis identical to a central axis of the insertion hole upper portion and communicating with the insertion hole upper portion, has a structure having an inner diameter corresponding to 50 to 90% of an inner diameter of the insertion hole upper portion, and has a structure having an inner diameter enabling insertion of an outer diameter of the downward extension pole.

Advantageous Effects

As described above, by an umbrella handle including a main pole, an upper end binding part, a link driving part, a downward extension pole, a holding binding part, an operation switch, and a holding part each having a specific structure, it is possible to provide an umbrella handle including a configuration that allows a user to change a length of an umbrella to be longer or shorter according to his or her intention, thereby further improving portability while maintaining an umbrella canopy area.

BEST MODE OF THE INVENTION

Hereinafter, exemplary embodiments of the present invention will be described in detail with reference to the accompanying drawings. Prior to this, terms or words used in the present specification and claims should not be construed as being limited to general or dictionary meanings and should be interpreted with meanings and concepts consistent with the technical spirit of the present invention.

Throughout the present specification, when a certain member is described as being located "on" another member, this not only includes a case in which the member is in contact with the other member, but also includes a case in which another member is present between the two members. Throughout the present specification, when a certain part is described as "including" a certain component, unless particularly described otherwise, this means that the part may further include other components instead of excluding other components.

Figure 1:
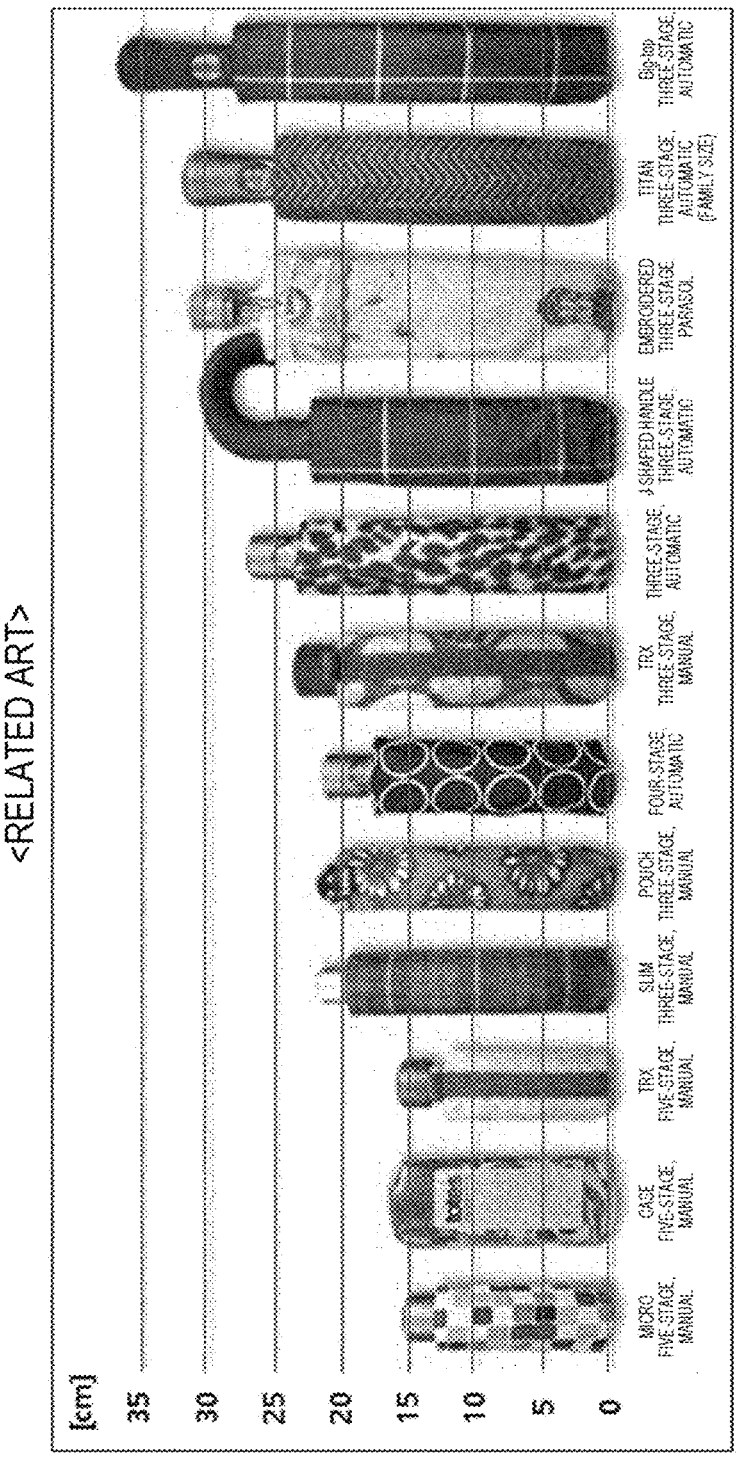
FIG. 1 is a picture showing sizes of umbrellas according to the related art.
Figure 2:
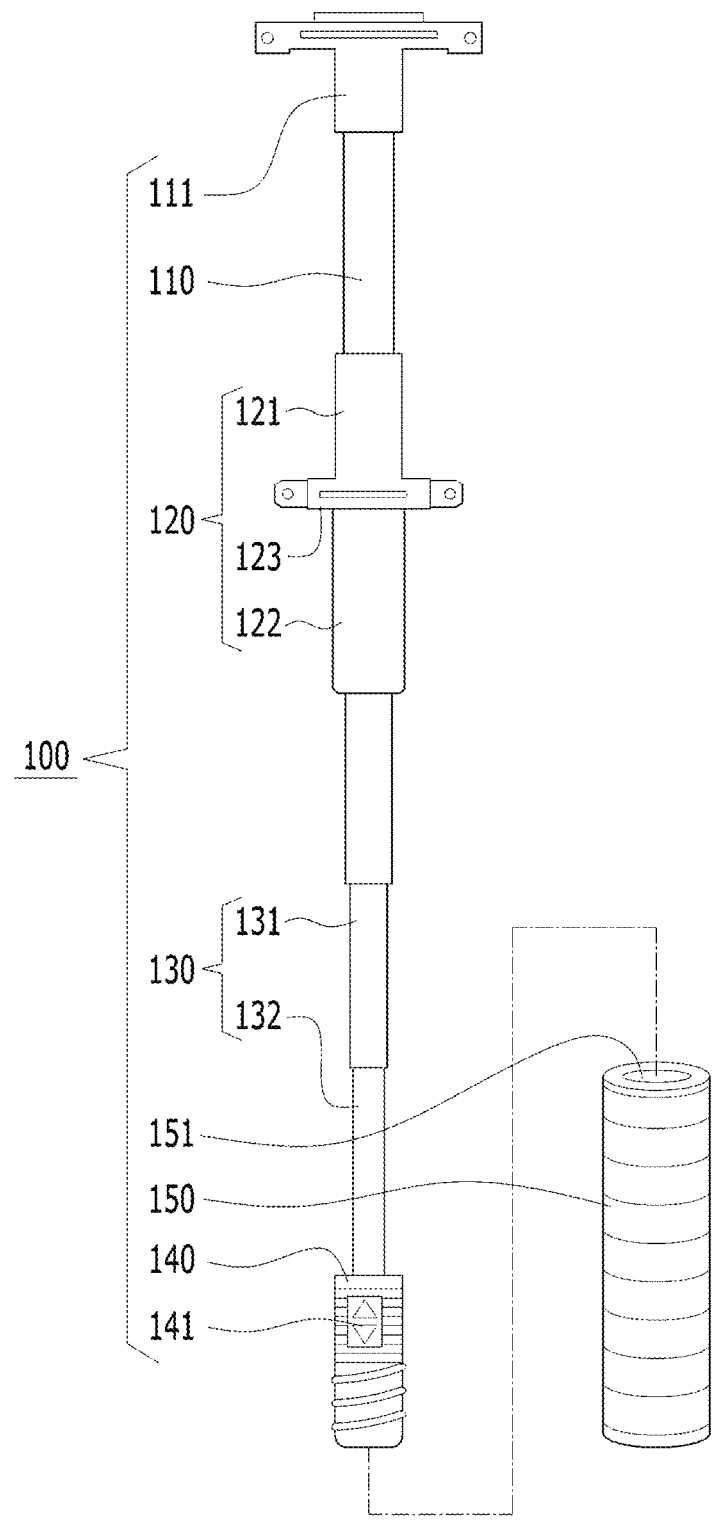
FIG. 2 is a perspective view illustrating an umbrella handle according to one embodiment of the present invention.

FIG. 2 illustrates a perspective view of an umbrella handle according to one embodiment of the present invention.

Referring to FIG. 2, an umbrella handle 100 according to the present embodiment is an umbrella handle mounted on an umbrella including an umbrella canopy that is opened to protect against rain or folded, umbrella ribs supporting a lower surface of the umbrella canopy, and a link structure mounted to unfold or fold the umbrella ribs, and by the umbrella handle 100 including a main pole 110, an upper end binding part 111, a link driving part 120, a downward extension pole 130, a holding binding part 140, an operation switch 141, and a holding part 150 each having a specific structure, it is possible to provide an umbrella handle including a configuration that allows a user to change a length of an umbrella to be longer or shorter according to his or her intention, thereby further improving portability while maintaining an area of the umbrella canopy.

Hereinafter, each component constituting the umbrella handle 100 according to the present embodiment will be described in detail with reference to the accompanying drawings.

The main pole 110 of the umbrella handle 100 according to the present embodiment has the upper end binding part 111, having a structure disposed at a center of the lower surface of the umbrella canopy and bound to the umbrella ribs, mounted on an upper end and extends a predetermined length downward.

The link driving part 120 according to the present embodiment is mounted on an outer circumferential surface of the main pole 110 to be movable by sliding in a vertical height direction and is bound to the link structure by a hinge structure.

The downward extension pole 130 according to the present embodiment is mounted to have a structure that is able to stretch downward from a lower end of the main pole 110 or contract.

The holding binding part 140 according to the present embodiment is mounted on a lower end of the downward extension pole 130, has a tubular structure that is able to be inserted into or withdrawn from the holding part 150, and has the operation switch 141 of the link driving part 120 mounted on an outer circumferential surface.

The holding part 150 according to the present embodiment has a tubular structure in which an insertion hole 151 is formed at an upper portion to allow the holding binding part 140 and the link driving part 120 to partially be inserted into or withdrawn from an upper surface and has a structure held by a hand of a user.

Figure 3:
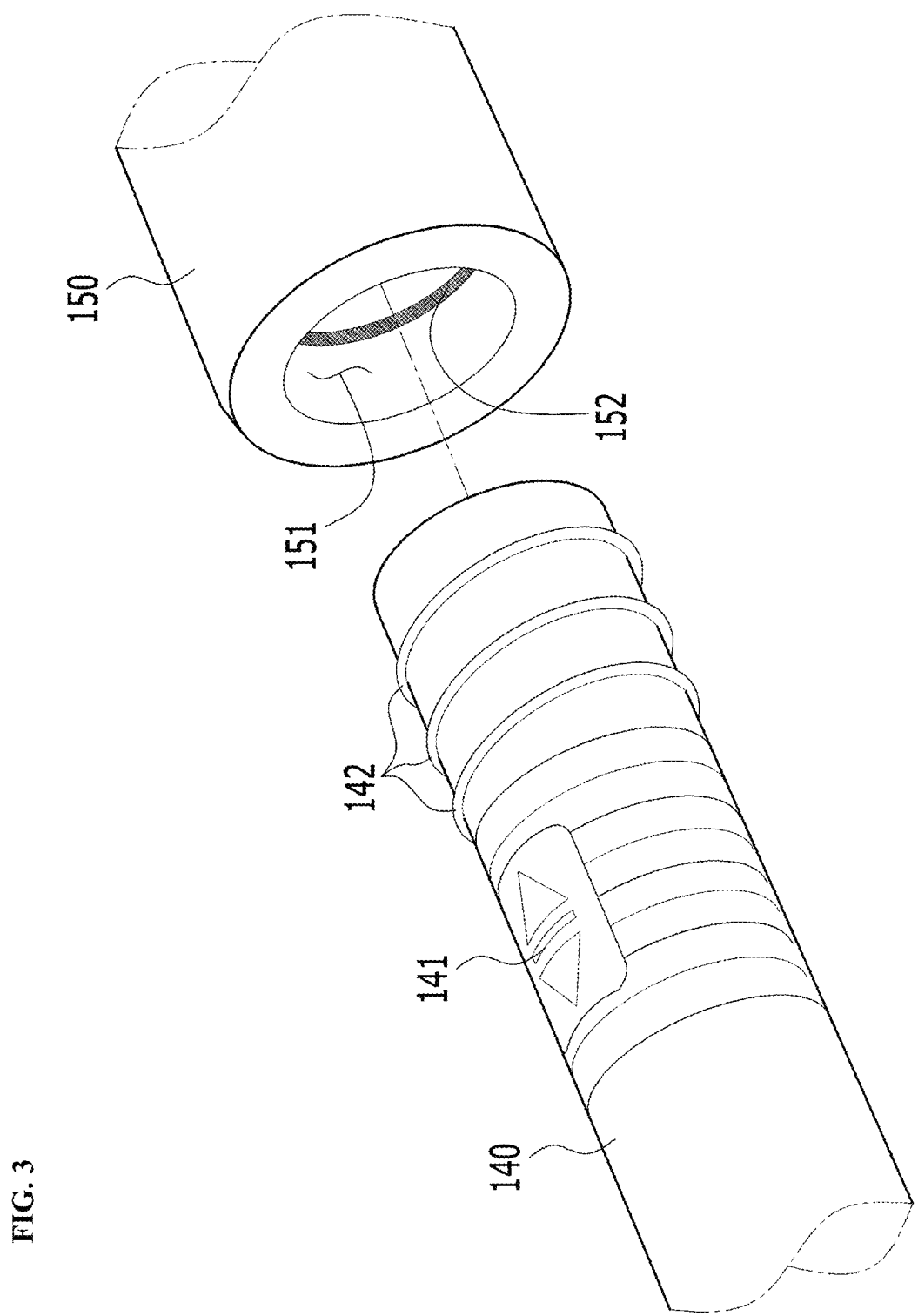
FIG. 3 is an enlarged view of a portion of a binding structure between a holding binding part and a holding part of the umbrella handle according to one embodiment of the present invention.
Figure 4:
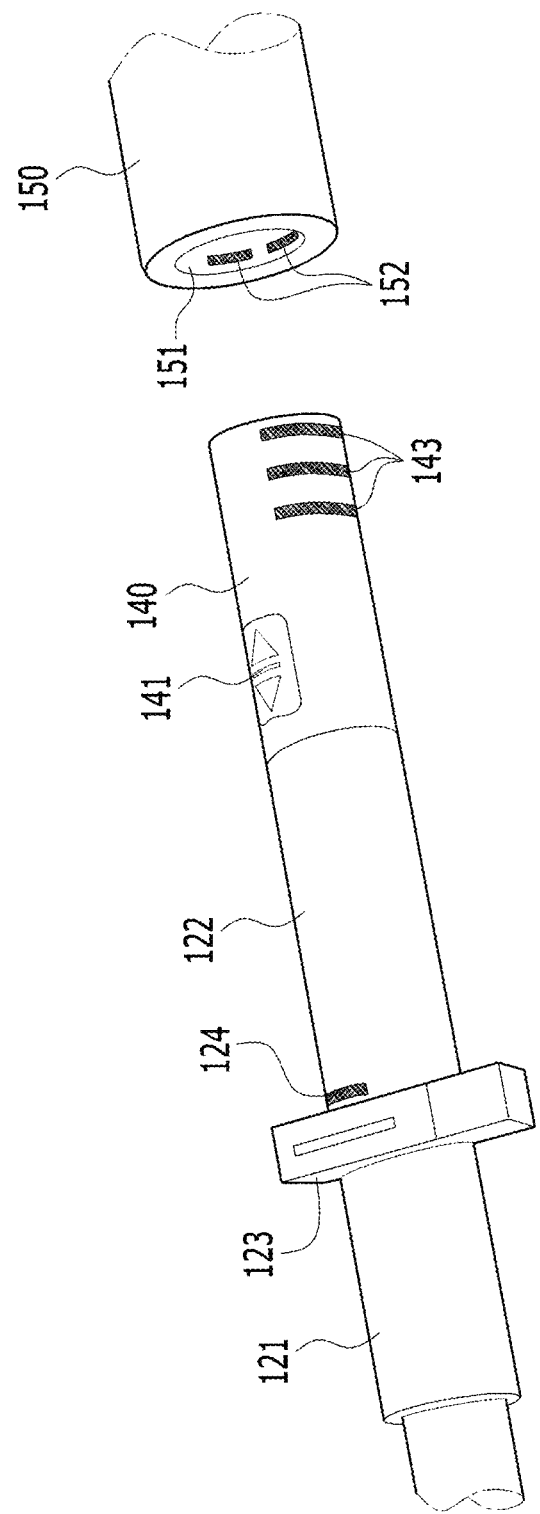
FIG. 4 is an enlarged view of a portion of the binding structure between the holding binding part and the holding part of the umbrella handle according to another embodiment of the present invention.
Figure 5:
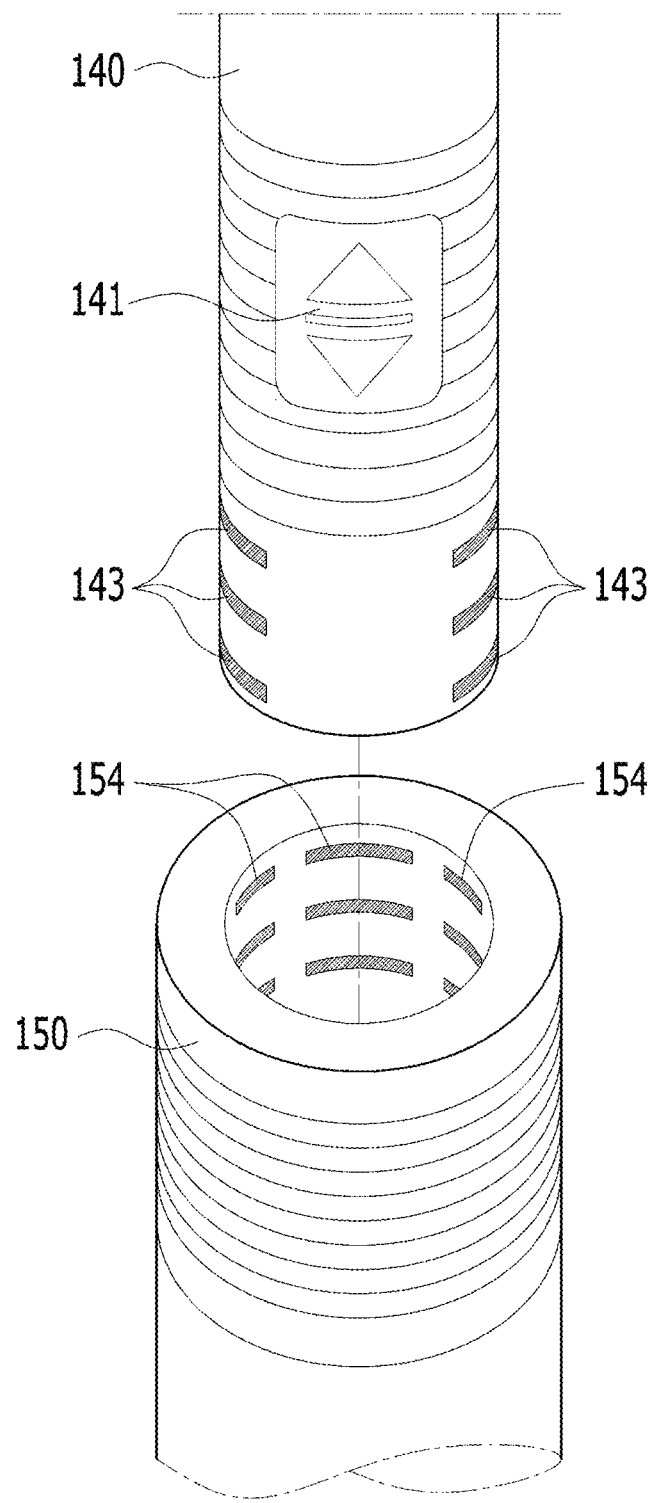
FIG. 5 is an enlarged view illustrating a portion of the binding structure of FIG. 4 in more detail.
Figure 6:
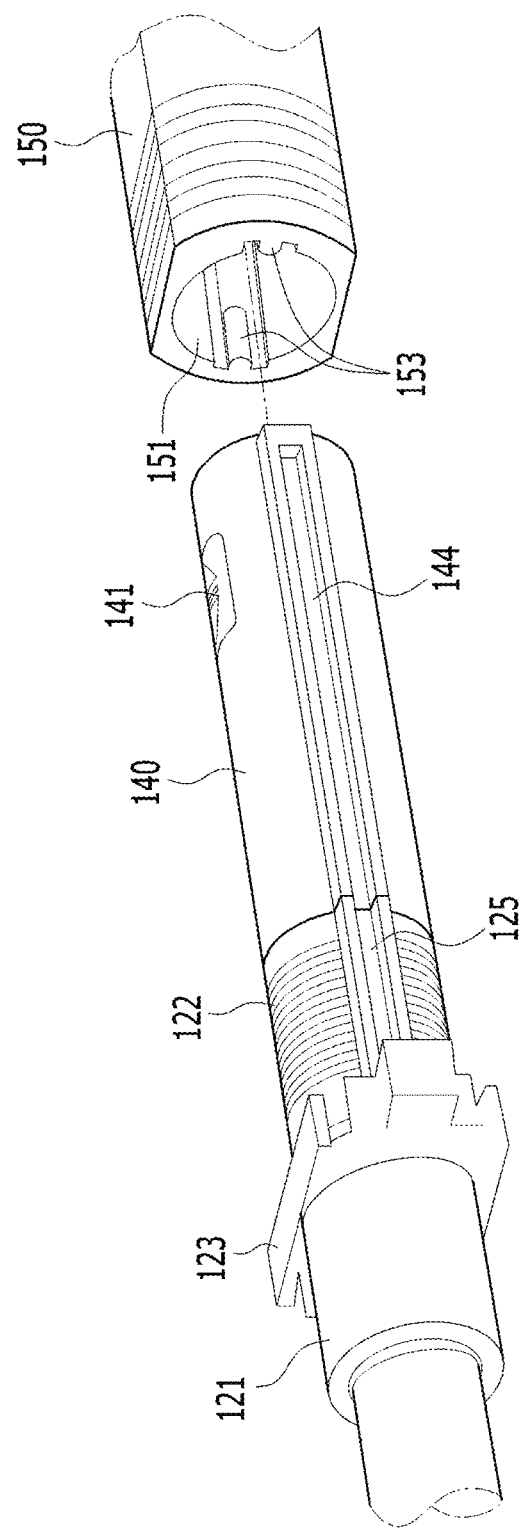
FIG. 6 is an enlarged view of a portion of the binding structure between the holding binding part and the holding part of the umbrella handle according to still another embodiment of the present invention.
Figure 7:
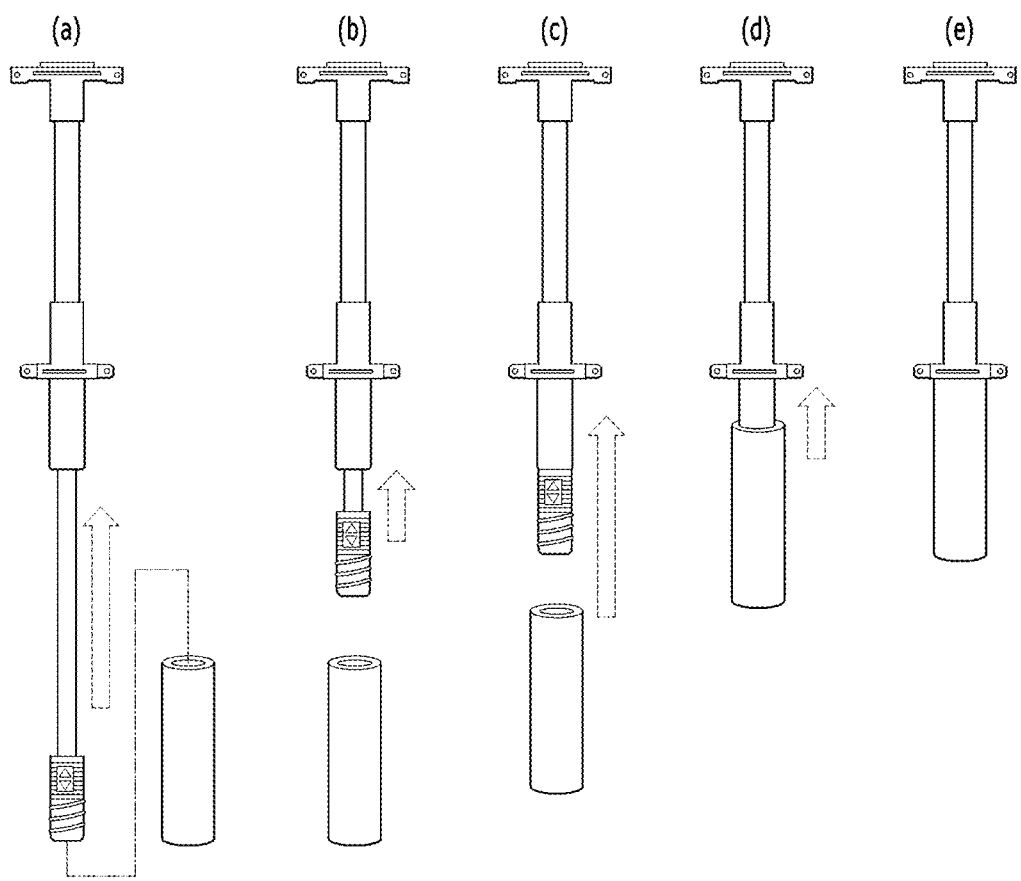
FIG. 7 is a perspective view illustrating states of changing a length of the umbrella handle according to yet another embodiment of the present invention.

FIG. 3 illustrates an enlarged view of a portion of a binding structure between a holding binding part and a holding part of the umbrella handle according to one embodiment of the present invention, FIG. 4 illustrates an enlarged view of a portion of the binding structure between the holding binding part and the holding part of the umbrella handle according to another embodiment of the present invention, and FIG. 5 illustrates an enlarged view illustrating a portion of the binding structure of FIG. 4 in more detail. In addition, FIG. 6 illustrates an enlarged view of a portion of the binding structure between the holding binding part and the holding part of the umbrella handle according to still another embodiment of the present invention, and FIG. 7 illustrates a perspective view illustrating states of changing a length of the umbrella handle according to yet another embodiment of the present invention.

Referring to these drawings, the link driving part 120 according to the present embodiment may be a component including an upper sliding part 121, a lower sliding part 122, and a hinge binding part 123.

Specifically, the upper sliding part 121 has a tubular structure mounted on the outer circumferential surface of the main pole 110 to be movable by sliding in the vertical height direction. The lower sliding part 122 has a tubular structure that is integrally formed with the upper sliding part 121, is mounted on the outer circumferential surface of the main pole 110 to be movable by sliding in the vertical height direction, and has an outer diameter that enables insertion or withdrawal into or from the insertion hole 151 of the holding part 150. In addition, the hinge binding part 123 is a component integrally mounted between the upper sliding part 121 and the lower sliding part 122 and may extend a predetermined width toward both sides to be bound to the link structure by the hinge structure.

Meanwhile, the downward extension pole 130 according to the present embodiment may be a component including a first extension part 131 and a second extension part 132 each having a specific structure. Specifically, the first extension part 131 is mounted by a sliding binding structure that is able to be inserted a predetermined depth into the main pole 110 from the lower end of the main pole 110 or discharged therefrom. In addition, the second extension part 132 is mounted by a sliding binding structure that is able to be inserted a predetermined depth into the first extension part 131 from a lower end of the first extension part 131 or discharged therefrom.

According to circumstances, as illustrated in FIG. 3, a binding protrusion 142 having a specific structure may be formed on a lower portion of the holding binding part 140 according to the present embodiment.

Specifically, the binding protrusion 142 is formed to have a spiral protrusion structure that is formed at a predetermined height on the lower portion of the holding binding part 140 to continuously surround an outer circumferential surface of the holding binding part 140. At this time, the holding part 150 may include a binding groove 152 that has a tubular structure and is formed to have a recessed groove structure on an inner circumferential surface of a hollow structure to correspond to the binding protrusion 142.

According to circumstances, as illustrated in FIGS. 4 and 5, a second binding metal plate 143 may be mounted to be spaced a predetermined height from the lower portion of the holding binding part 140. The second binding metal plate 143 has a structure continuous with the outer circumferential surface of the holding binding part 140. In addition, a first binding metal plate 124 may be mounted on an upper portion of the lower sliding part 122. The first binding metal plate 124 has a structure continuous with an outer circumferential surface of the lower sliding part 122. At this time, the holding part 150 may include a magnetic member 153 of a specific structure provided as a plurality of magnetic members 153 that have a tubular structure and are mounted to be spaced a predetermined height from the inner circumferential surface of the hollow structure. Specifically, the magnetic member 153 has a structure attachable to and detachable from the first binding metal plate 124 and the second binding metal plate 143 by magnetism and has a structure continuous with the inner circumferential surface of the hollow structure.

A user may easily and stably change a binding length of the holding binding part 140 and the holding part 150 using the first binding metal plate 124 and the second binding metal plate 143 that are attached to the magnetic member 153 by magnetism.

According to circumstances, as illustrated in FIG. 6, a second rail part 144 may be formed to continuously protrude from both side surfaces of the holding binding part 140 in the vertical height direction. The second rail part 144 has a structure that is formed to have a protruding part seated thereon and guide the protruding part to be movable by sliding in the vertical height direction. In addition, a first rail part 125 may be formed to continuously protrude from both side surfaces of the lower sliding part 122 in the vertical height direction. The first rail part 125 has a structure formed to be continuous with the second rail part 144 and formed to, together with the second rail part 144, have the protruding part seated thereon and guide the protruding part to be movable by sliding in the vertical height direction.

At this time, the holding part 150 may have a protruding part 153 that has a tubular structure and is formed to continuously protrude from both sides of the inner circumferential surface of the hollow structure in the vertical height direction. The protruding part 153 is seated on the second rail part 144 and the first rail part 125 to be movable by sliding in the vertical height direction.

According to the present invention including the above-mentioned configuration, as illustrated in FIG. 7, the binding length of the holding part 150 and the holding binding part 140 can be easily adjusted, the length can be changed so that the lower sliding part 122 of the link driving part 120 and the holding part 150 are bound to each other, and simultaneously, a stable binding structure between the lower sliding part 122 and the holding part 150 can be implemented. In addition, the length of the downward extension pole 130 can also be easily and stably changed according to an intention of the user, and as a result, it is possible to provide an umbrella handle including a configuration that allows the user to change the length of the umbrella to be longer or shorter according to his or her intention, thereby further improving portability while maintaining an umbrella canopy area.

Figure 8:
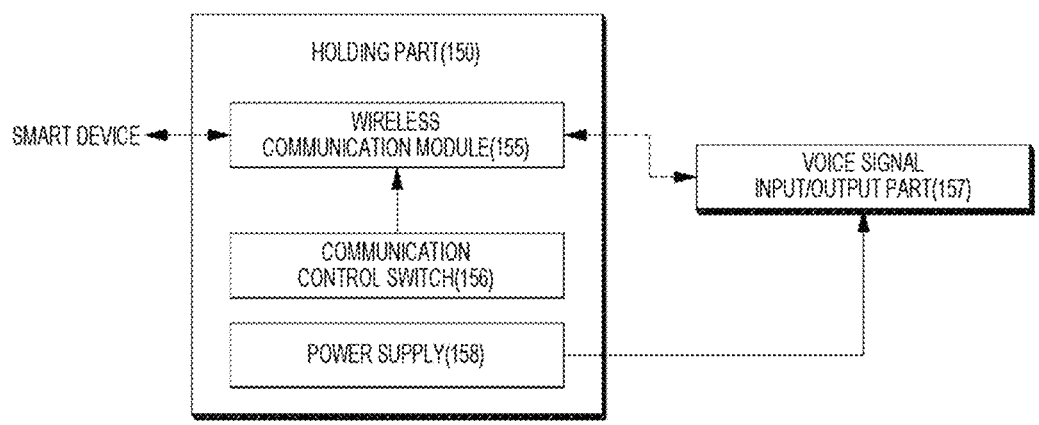
FIG. 8 is a control block diagram of the umbrella handle according to yet another embodiment of the present invention.

FIG. 8 illustrates a control block diagram of the umbrella handle according to yet another embodiment of the present invention.

Referring to FIG. 8 along with FIG. 2, the umbrella handle 100 according to the present embodiment may include a wireless communication module 155, a communication control switch 156, a voice signal input/output part 157, and a power supply 158 each performing a specific role.

Specifically, the wireless communication module 155 is a component mounted in the holding part 150 and wirelessly communicates with a smart device of the user. The communication control switch 156 may be mounted adjacent to the operation switch 141 and may control an operation state of the wireless communication module 155. In addition, the voice signal input/output part 157 is a component mounted on one side of the link driving part 120 and outputs a voice signal received from the wireless communication module 155 or receives a voice signal generated by the user and inputs the voice signal to the smart device of the user through the wireless communication module 155. The power supply 158 is a component embedded in the holding part 150 and may be charged by power supplied from the outside.

In this case, the user may receive a call or data received through a smartphone, a smart pad, or a smart watch by wireless communication with the smart device through the voice signal input/output part 157, and according to circumstances, a voice signal of the user may be input to the voice signal input/output part 157 and input to the smart device of the user. For example, the user may conveniently make a call through wireless communication with a smartphone.

Figure 9:
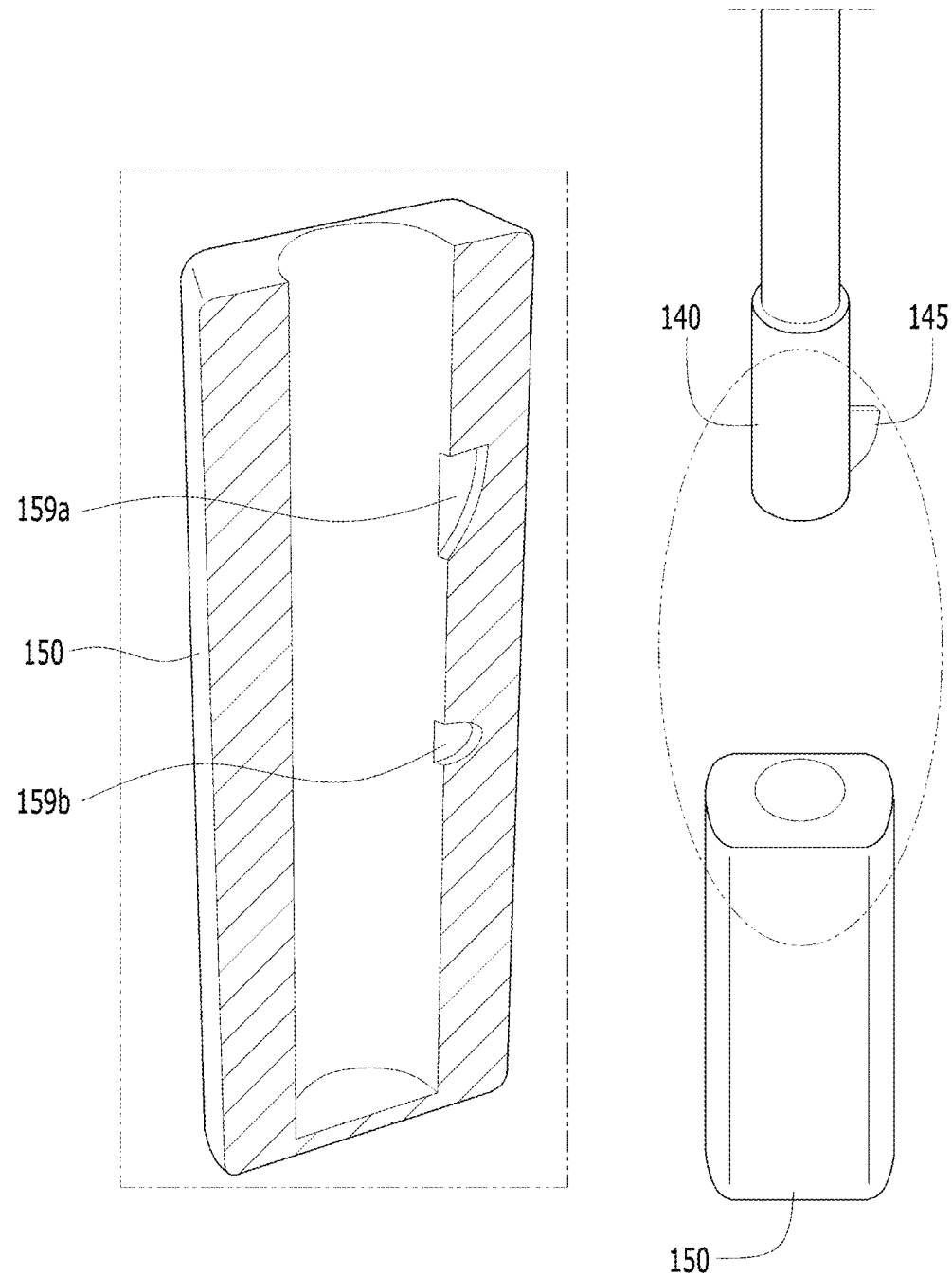
FIG. 9 is an enlarged view of portions of the holding binding part and the holding part of the umbrella handle according to yet another embodiment of the present invention.
Figure 10:
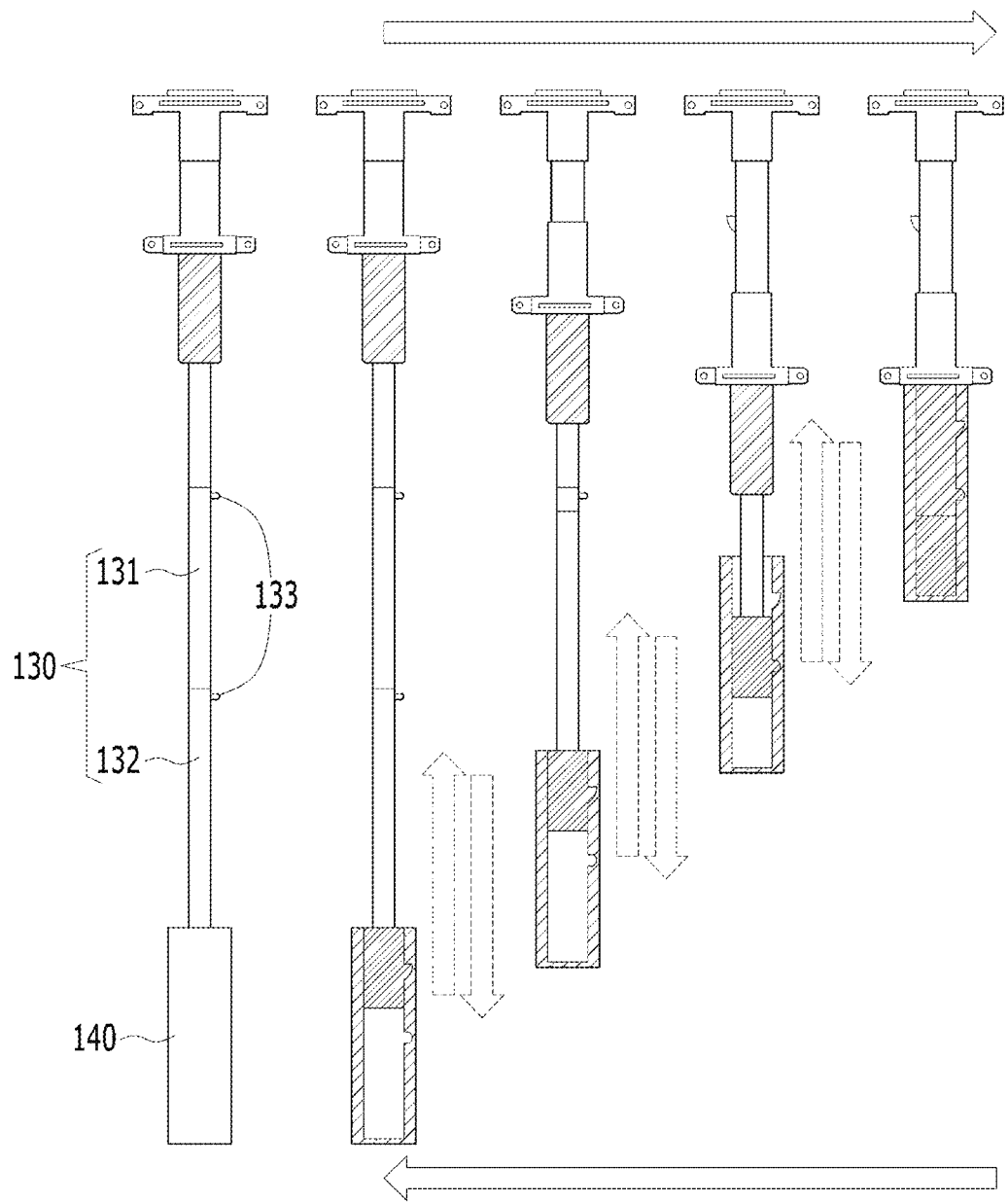
FIG. 10 is a view illustrating states of changing the length of the umbrella handle using the holding binding part and the holding part illustrated in FIG. 9.
Figure 11:
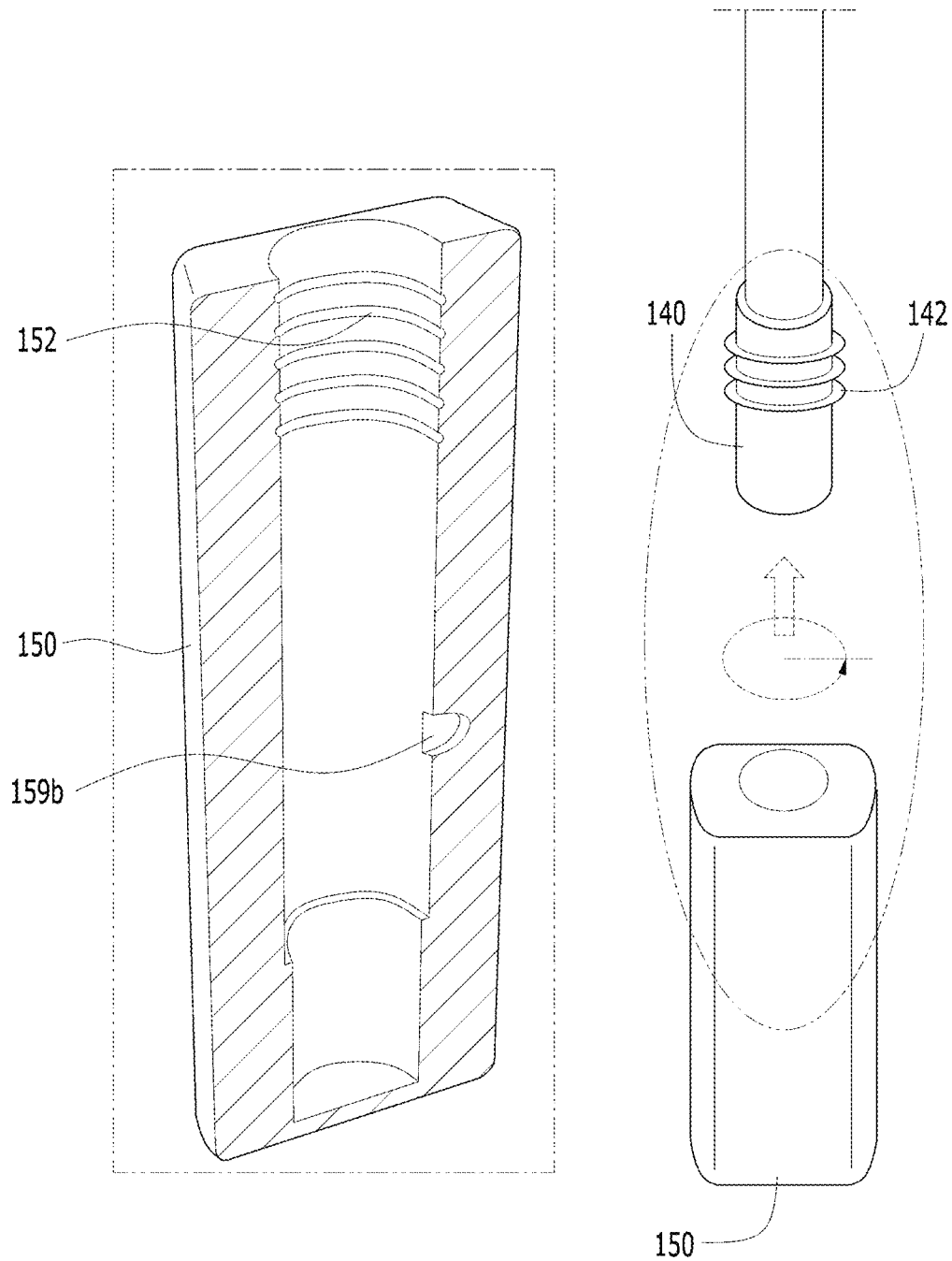
FIG. 11 is an enlarged view of portions of the holding binding part and the holding part of the umbrella handle according to yet another embodiment of the present invention.
Figure 12:
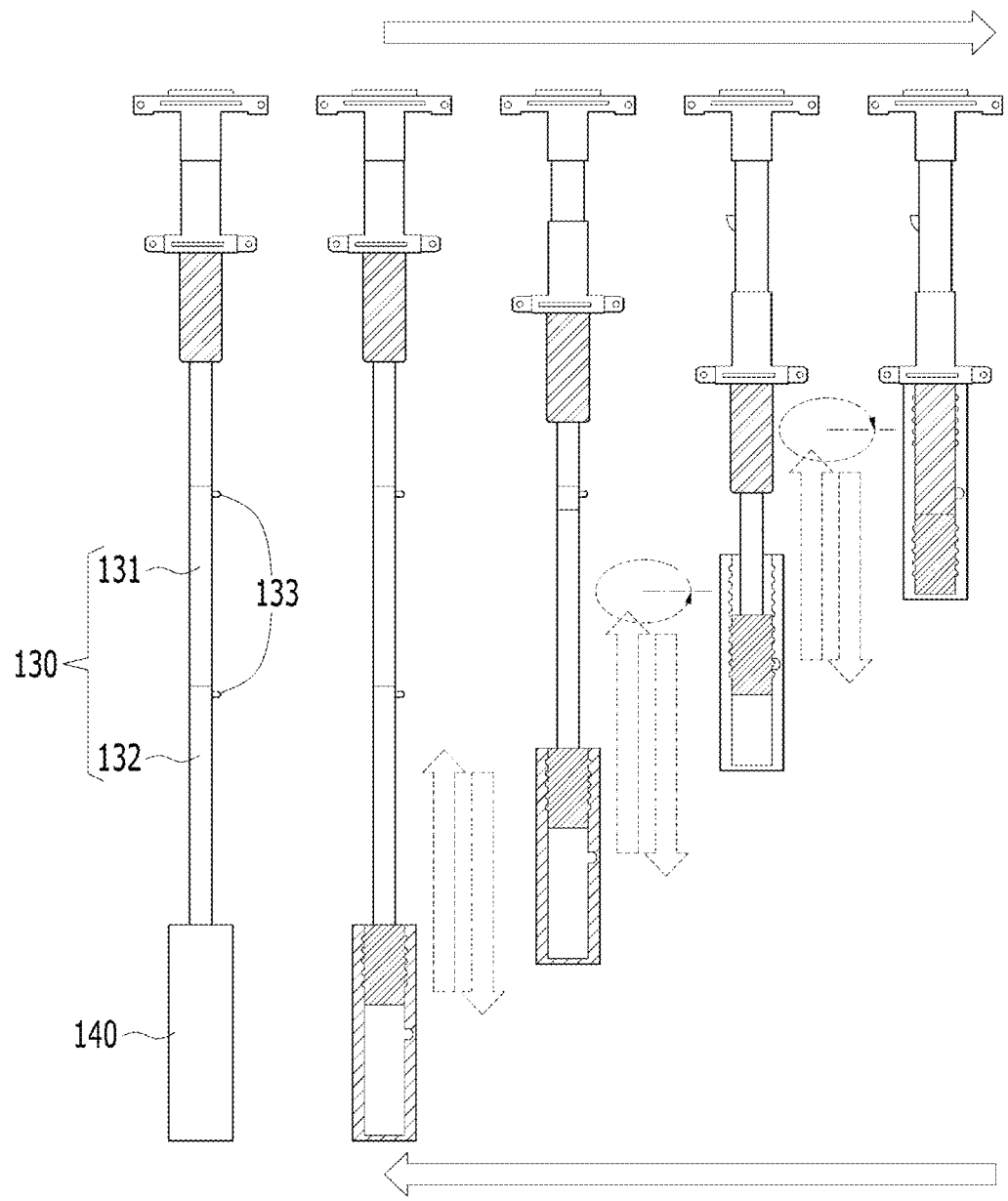
FIG. 12 is a view illustrating states of changing the length of the umbrella handle using the holding binding part and the holding part illustrated in FIG. 11.

FIG. 9 illustrates an enlarged view of portions of the holding binding part and the holding part of the umbrella handle according to yet another embodiment of the present invention, and FIG. 10 illustrates a view illustrating states of changing the length of the umbrella handle using the holding binding part and the holding part illustrated in FIG. 9. In addition, FIG. 11 illustrates an enlarged view of portions of the holding binding part and the holding part of the umbrella handle according to yet another embodiment of the present invention, and FIG. 12 is a view illustrating states of changing the length of the umbrella handle using the holding binding part and the holding part illustrated in FIG. 11.

Referring to these drawings, a second binding protrusion 133 having a structure that elastically protrudes from an outer surface of the downward extension pole 130 according to the present embodiment may be mounted on one end portion of the first extension part 131 and one end portion of the second extension part 132. At this time, a second binding groove 159*b* having a structure that can be bound to the second binding protrusion 133 may be formed inside the holding part 150. In this case, as illustrated in FIGS. 10 and 12, when changing the length of the umbrella handle, by engaging the second binding protrusion 133 with the second binding groove 159*b* and binding the second binding protrusion 133 and the second binding groove 159*b* while the downward extension pole 130 is folded and accommodated in the holding part 150, a length-reduced state can be stably maintained.

In addition, as illustrated in FIGS. 9 and 10, a first binding protrusion 145 having a structure that elastically protrudes may be mounted on the outer circumferential surface of the holding binding part 140. At this time, the first binding protrusion 145 may have a right triangle structure having an inclined surface formed downward. In addition, a first binding groove 159*a* having a structure that can be bound to the first binding protrusion 145 may be formed inside the holding part 150. In this case, as illustrated in FIG. 10, the holding binding part 140 may form a structure that is not removed to the outside due to easily being inserted into the holding part 150 and then fixed. At this time, the holding binding part 140 may be inserted by further sliding into the holding part 150, and the length-reduced state can be stably maintained by the second binding protrusion 133 being bound to the second binding groove 159*b*. Then, when the holding binding part 140 is taken out of the holding part 150, the first binding protrusion 145 is engaged with the first binding groove 159*a* again and fixed, the downward extension pole 130 is further stretched upward, and the overall length thereof may be changed.

Figure 13:
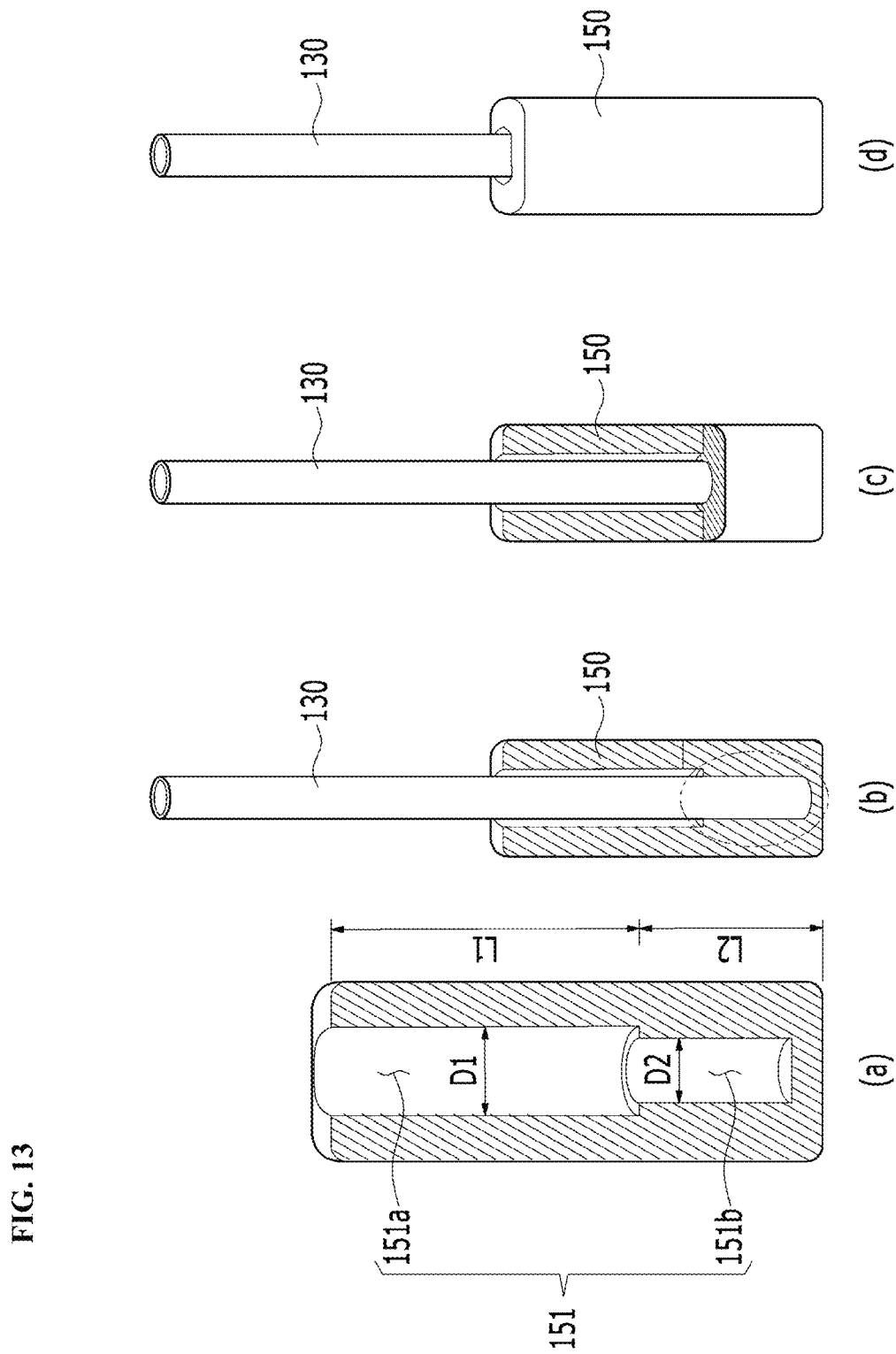
FIG. 13 is a cross-sectional view of a portion of an inner structure of the holding part of the umbrella handle according to yet another embodiment of the present invention.
Figure 14:
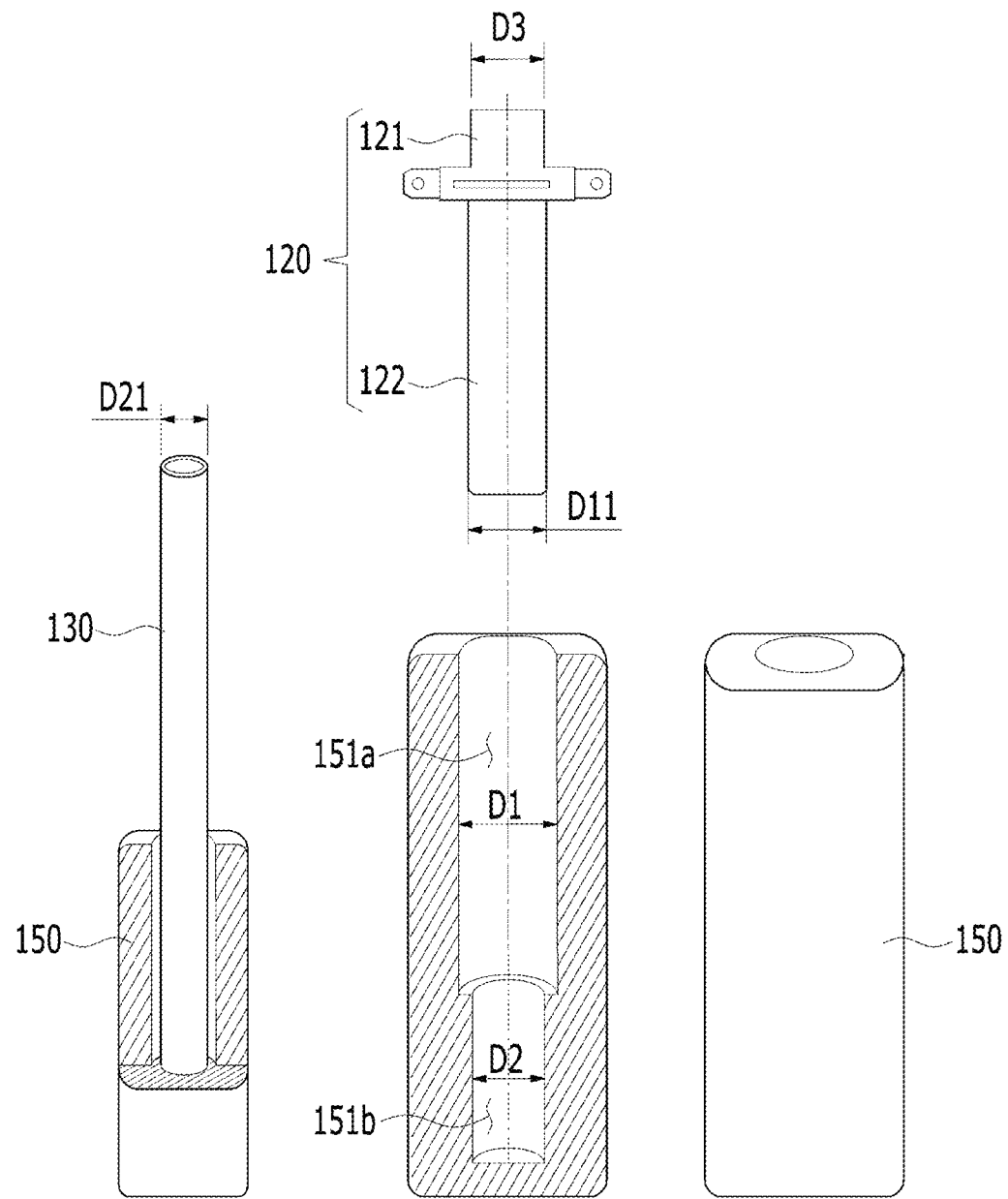
FIG. 14 is a cross-sectional view of portions showing a comparison of sizes of inner diameters of an insertion hole upper portion and an insertion hole lower portion constituting an insertion hole of the holding part, an outer diameter of a downward extension pole, an outer diameter of a lower sliding part, and an outer diameter of an upper sliding part that are illustrated in FIG. 13.
Figure 15:
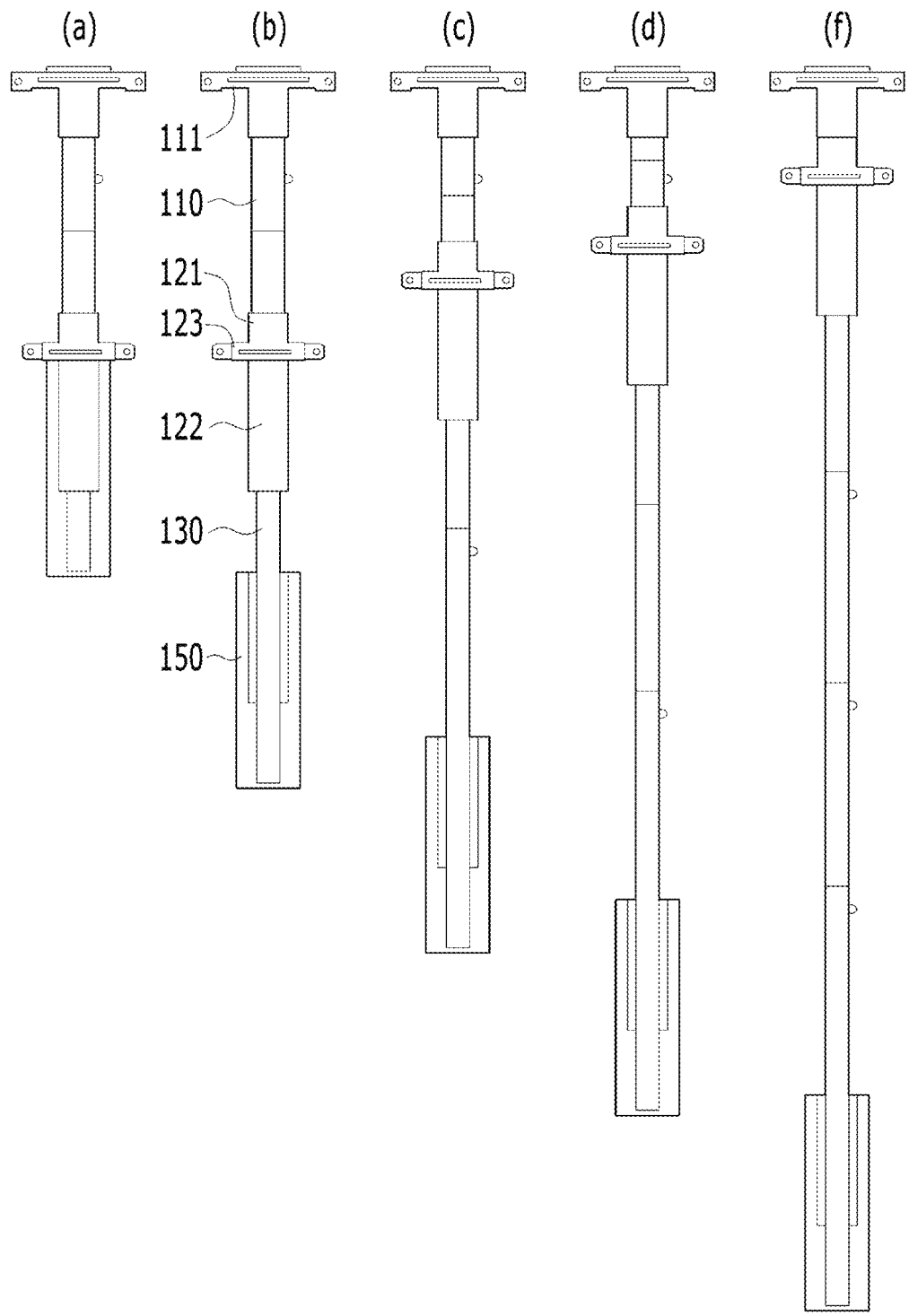
FIG. 15 is a front view illustrating states of changing the length of the umbrella handle using the configuration illustrated in FIG. 14.
Figure 16:
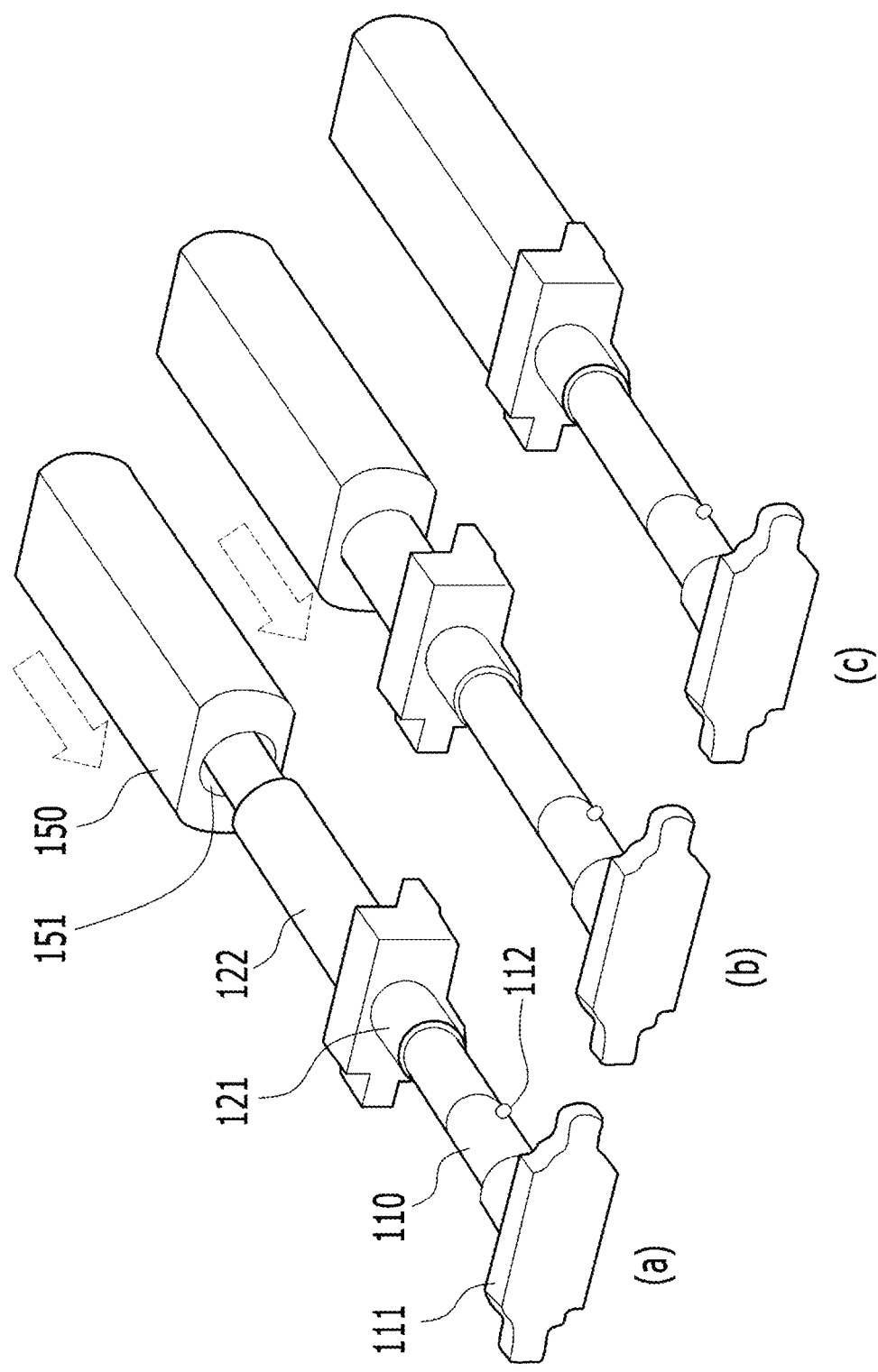
FIG. 16 is a perspective view illustrating states of changing the length of the umbrella handle illustrated in FIG. 15.

FIG. 13 illustrates a cross-sectional view of a portion of an inner structure of the holding part of the umbrella handle according to yet another embodiment of the present invention, and FIG. 14 illustrates a cross-sectional view of portions showing a comparison of sizes of inner diameters of an insertion hole upper portion and an insertion hole lower portion constituting an insertion hole of the holding part, an outer diameter of a downward extension pole, an outer diameter of a lower sliding part, and an outer diameter of an upper sliding part that are illustrated in FIG. 13. In addition, FIG. 15 illustrates a front view illustrating states of changing the length of the umbrella handle using the configuration illustrated in FIG. 14, and FIG. 16 illustrates a perspective view illustrating states of changing the length of the umbrella handle illustrated in FIG. 15.

Referring to these drawings, the insertion hole 151 formed inside the holding part 150 according to the present embodiment may include an insertion hole upper portion 151*a* and an insertion hole lower portion 151*b*. At this time, preferably, an inner diameter D2 of the insertion hole lower portion 151*b* may be set to have a length that corresponds to 50 to 90% of a length of an inner diameter D1 of the insertion hole upper portion 151*a*. In this case, preferably, the lower sliding part 122 of the link driving part 120 may have a structure having an outer diameter D11 equal to the inner diameter D1 of the insertion hole upper portion 151*a* in order to be seated in a state in which the lower sliding part 122 is stably inserted into an inner circumferential surface of the insertion hole upper portion 151*a* and is in surface contact therewith.

In yet another embodiment, the holding binding part 140 may be omitted from the lower end of the downward extension pole 130, and the downward extension pole 130 may be directly adhered and fixed to the insertion hole lower portion 151*b* of the holding part 150. At this time, preferably, an outer diameter D21 of the downward extension pole 130 may have the same size as the inner diameter of the insertion hole lower portion 151*b*.

More preferably, the size relationship of "outer diameter D21 of the downward extension pole 130<outer diameter D3 of the upper sliding part 121<outer diameter D11 of lower sliding part 122<inner diameter D1 of the insertion hole upper portion 151*a*" may be established in the structure.

When such a size relationship is established, as illustrated in FIGS. 15 and 16, the length of the umbrella handle can be stably changed.

According to circumstances, as illustrated in FIG. 16, the main pole 110 may be configured to have a length-adjustable structure, and the length of the main pole 110 may be changed in stages by mounting a main pole binding protrusion 112.

In the detailed description of the present invention given above, only some embodiments according to the present invention have been described. However, the present invention should not be understood as being limited to the embodiments mentioned in the detailed description above, and on the contrary, the present invention should be understood as including all modifications, equivalents, and substitutes within the spirit and scope of the present invention defined by the appended claims.

That is, the present invention is not limited to specific embodiments described above and the description given above, those of ordinary skill in the art to which the present invention pertains can make various modifications without departing from the gist of the present invention claimed in the claims, and such modifications also belong to the protection scope of the present invention.

Modes of the Invention

The modes of the invention have been described above in the best mode of the invention.

INDUSTRIAL APPLICABILITY

The present invention relates to an umbrella handle including a portability improving structure and has industrial applicability because it is possible to provide an umbrella handle including a configuration that allows a user to change a length of an umbrella to be longer or shorter according to his or her intention, thereby further improving portability while maintaining an umbrella canopy area.

The invention claimed is:

1. An umbrella handle mounted on an umbrella including an umbrella canopy that is opened to protect against rain or folded, umbrella ribs supporting a lower surface of the umbrella canopy, and a link structure mounted to unfold or fold the umbrella ribs, the umbrella handle comprising:
a main pole (110) that has an upper end binding part (111), having a structure disposed at a center of the lower surface of the umbrella canopy and bound to the umbrella ribs, mounted on an upper end and that extends a predetermined length downward;
a link driving part (120) mounted on an outer circumferential surface of the main pole (110) to be movable by sliding in a vertical height direction and bound to the link structure by a hinge structure;
a downward extension pole (130) mounted to have a structure that is able to stretch downward from a lower end of the main pole (110) or contract;
a holding binding part (140) that is mounted on a lower end of the downward extension pole (130), has a tubular structure that is able to be inserted into or withdrawn from a holding part (150), and has an operation switch (141) of the link driving part (120) mounted on an outer circumferential surface; and
the holding part (150) that has a tubular structure in which an insertion hole (151) is formed in an upper surface to allow the holding binding part (140), the downward extension pole (130), and a lower sliding part (122) of the link driving part (120) to be inserted into or withdrawn and that has a structure held by a hand of a user,
wherein the link driving part (120) includes an upper sliding part (121) having a tubular structure mounted on the outer circumferential surface of the main pole (110) to be movable by sliding in the vertical height direction; the lower sliding part (122) having a tubular structure that is integrally formed with the upper sliding part (121), is mounted on the outer circumferential surface of the main pole (110) to be movable by sliding in the vertical height direction, and has an outer diameter that enables insertion or withdrawal into or from the insertion hole (151) of the holding part (150); and a hinge binding part (123) integrally mounted between the upper sliding part (121) and the lower sliding part (122) and extending a predetermined width toward both sides to be bound to the link structure by the hinge structure,
the downward extension pole (130) includes a first extension part (131) mounted by a sliding binding structure that is able to be inserted a predetermined depth into the main pole (110) from the lower end of the main pole (110) or discharged therefrom; and a second extension part (132) mounted by a sliding binding structure that is able to be inserted a predetermined depth into the first extension part (131) from a lower end of the first extension part (131) or discharged therefrom, the holding binding part (140) includes a second rail part (144) having a structure that is formed to continuously protrude from both side surfaces of the holding binding part (140) in the vertical height direction and formed to have a protruding part seated thereon and guide the protruding part to be movable by sliding in the vertical height direction, and the link driving part (120) includes a first rail part (125) having a structure that is formed to continuously protrude from both side surfaces of the lower sliding part (122) in the vertical height direction, formed to be continuous with the second rail part (144), and formed to, together with the second rail part (144), have the protruding part seated thereon and guide the protruding part to be movable by sliding in the vertical height direction; and the holding part (150) includes a protruding part (153) that has a tubular structure and has a structure formed to continuously protrude from both sides of the inner circumferential surface of the hollow structure in the vertical height direction and seated on the second rail part (144) and the first rail part (125) to be movable by sliding in the vertical height direction.

2. The umbrella handle of claim 1, wherein the holding part (150) includes:

a wireless communication module (155) mounted in the holding part (150) and configured to wirelessly communicate with a smart device of the user;

a communication control switch (156) mounted adjacent to the operation switch (141) and configured to control an operation state of the wireless communication module (155); and a voice signal input/output part (157) mounted on one side of the link driving part (120) and configured to output a voice signal received from the wireless communication module (155) or receive a voice signal generated by the user and input the voice signal to the smart device of the user through the wireless communication module (155).

\* \* \* \* \*